United States Patent
Rattunde (10) Patent No.: US 11,305,447 B2
(45) Date of Patent: Apr. 19, 2022

(54) PIPE CUTTING MACHINE WITH A CONTROLLED FLOATING CUTTING MANDREL, AND CUTTING METHOD

(71) Applicant: RATTUNDE AG, Ludwigslust (DE)

(72) Inventor: Ulrich Rattunde, Ludwigslust (DE)

(73) Assignee: Rattunde AG, Ludwigslust (DE)

( * ) Notice: Subject to any disclaimer, the term of this patent is extended or adjusted under 35 U.S.C. 154(b) by 155 days.

(21) Appl. No.: 16/765,500

(22) PCT Filed: Nov. 16, 2018

(86) PCT No.: PCT/EP2018/081508
§ 371 (c)(1),
(2) Date: May 20, 2020

(87) PCT Pub. No.: WO2019/096969
PCT Pub. Date: May 23, 2019

(65) Prior Publication Data
US 2020/0316696 A1 Oct. 8, 2020

(30) Foreign Application Priority Data
Nov. 20, 2017 (DE) .......................... 102017127326.3

(51) Int. Cl.
*B26D 3/16* (2006.01)
*B23D 33/02* (2006.01)
(Continued)

(52) U.S. Cl.
CPC .............. *B26D 3/164* (2013.01); *B23D 21/14* (2013.01); *B23D 33/02* (2013.01); *B23D 35/001* (2013.01); *B26D 2007/013* (2013.01)

(58) Field of Classification Search
CPC .......... B23D 3/164; B23D 3/16; B23D 33/02; B23D 35/001; B26D 2007/013;
(Continued)

(56) References Cited

U.S. PATENT DOCUMENTS

| 3,567,088 A * | 3/1971 | Andersen | B23D 21/14 |
| | | | 225/103 |
| 4,470,330 A * | 9/1984 | Lindell | B23D 21/00 |
| | | | 83/179 |
| 4,889,023 A | 12/1989 | Languillat | |

FOREIGN PATENT DOCUMENTS

| DE | 2430608 A1 | 1/1975 | |
| DE | 10162135 A1 * | 7/2003 | .............. B26D 3/164 |

(Continued)

OTHER PUBLICATIONS

International Search Report, European Patent Office, dated Mar. 1, 2019.
(Continued)

*Primary Examiner* — Jennifer S Matthews
(74) *Attorney, Agent, or Firm* — Bay State IP, LLC (57) ABSTRACT

A pipe cutting machine with a pipe (3), from which a pipe section (3a) is to be cut to size, a stationary cutting die (1), a movable cutting die (2) which can be moved relative to the stationary cutting die (1), and a cutting mandrel (13) which is introduced into the pipe (3) and which comprises a stationary mandrel (14) and a mandrel (16) that can be moved relative to the stationary mandrel (14). The cutting mandrel (13) is arranged in a cutting position during a cutting process, and the cutting mandrel (13) is arranged in the pipe (3) in a floating manner. A magnetic coupling (6) is provided with a coupling stator (7) arranged outside of the pipe (3) and a coupling rotor (21) arranged on the stationary mandrel (14).

8 Claims, 8 Drawing Sheets

(51) Int. Cl.
*B23D 21/14* (2006.01)
*B23D 35/00* (2006.01)
*B26D 7/01* (2006.01)

(58) Field of Classification Search
CPC ... Y10T 83/386; Y10T 83/385; Y10T 83/412; Y10T 83/404
See application file for complete search history.

(56) References Cited

FOREIGN PATENT DOCUMENTS

| | | | |
|---|---|---|---|
| DE | 102010061191 A1 | 6/2012 | |
| KR | 950009069 Y1 * | 10/1995 | |
| SU | 1196167 A1 * | 12/1985 | |
| WO | WO-9423876 A1 * | 10/1994 | ............ B23D 21/14 |
| WO | 2018054706 A1 | 3/2018 | |

OTHER PUBLICATIONS

Written Opinion of the International Searching Authority, European Patent Office, dated Mar. 1, 2019.

* cited by examiner

PIPE CUTTING MACHINE WITH A CONTROLLED FLOATING CUTTING MANDREL, AND CUTTING METHOD

CROSS REFERENCE TO RELATED APPLICATION

This application is for entry into the U.S. National Phase under § 371 for International Application No. PCT/EP2018/081508 having an international filing date of Nov. 16, 2018, and from which priority is claimed under all applicable sections of Title 35 of the United States Code including, but not limited to, Sections 120, 363, and 365(c) and which in turn claims priority under 35 USC 119 to German Patent Application No. 102017127326.3 filed on Nov. 20, 2017.

The invention relates to a pipe cutting machine according to the preamble to claim 1 and to a method for cutting pipe sections of a pipe to size.

According to the prior art, cutting machines having mandrel mountings for a cutting eccentric drive having a variable stroke are known.

For pipe shearing methods it is necessary to position a cutting mandrel in the pipe to be cut to size in such a way that a cutting mandrel gap lies exactly in the axial direction of the pipe inside the cutting gap of two cutting dies. In the prior art it is known for the cutting mandrel to be connected by a rod through the pipe to an adjusting device and to be held in position and to be advanced for the subsequent cutting cycle. The axial fastening of the rod and the positioning of the cutting mandrel can take place as required from the pipe feeding side or from the pipe cutting side. However, it is a disadvantage that in the first case the mandrel must be pushed through the entire initial pipe length before the cutting operation can begin, or that the mandrel, if in the second case it is fastened from the cutting side, must be moved away and opened for removal of one or more pipe sections that have been cut to size. The known pipe shearing methods therefore require a large amount of time for positioning the mandrel.

The positioning through the initial pipe is additionally very susceptible to malfunction, since the holding rod can be very long, for example six to twelve metres. The resulting large temperature-dependent longitudinal extent and the sagging are obstructive for the exact positioning of the mandrel gap. In any case, for the shearing method it is imperative to position the mandrel gap absolutely exactly.

A method for cutting workpieces is known from DE 2 430 608 A1. In this case a support element or mandrel consisting of two elements which are separable from one another is provided, wherein one element is produced from a hardened magnetic material, the other element is made from a hardened material. A solenoid coil is arranged adjacent to the one element.

A pipe cutting machine with a mandrel mounted in a floating manner is known from U.S. Pat. No. 4,889,023, in which the mandrel is positioned by means of a magnetic field.

Therefore the object of the invention is to provide a pipe cutting machine and a method for cutting pipe sections to size which reduce the above-mentioned disadvantages.

This object is achieved in a first aspect by a pipe cutting machine referred to in the introduction and having the features of claim 1.

First of all, a pipe cutting machine should be understood here to be a pipe shearing machine. A pipe should preferably be understood to be a longitudinal profile which has a circular external periphery in cross-section and a circular internal periphery in cross-section and is preferably paramagnetic or diamagnetic here.

The pipe cutting machine here comprises the already inserted pipe, from which a pipe section is to be cut to size, and a die cutter with a stationary cutting die and a movable cutting die which can be moved relative to the stationary cutting die and also a cutting mandrel which is introduced into the pipe and has a stationary mandrel and a movable mandrel which can be moved relative to the stationary mandrel.

The cutting mandrel is arranged in the interior of the pipe during the cutting operation. In this case a mandrel gap, that is to say a distance between a flat end of the stationary mandrel and a flat end of the movable mandrel, is smaller than the radially lengthened die gap and is arranged along the entire circumference of the pipe inside the radially lengthened die gap, that is to say the distance between the cutting die in a fixed position and the movable cutting die. The cutting die is preferably driven by an eccentric drive in an eccentric movement relative to the stationary cutting die, which is a spirally increasing movement, that is to say a movement with a variable stroke. By this eccentric movement the pipe section can be cut off from the pipe.

The movable cutting die is preferably connected to the eccentric drive; furthermore, a feed device, for example in the form of a movable gripper, is provided, which advances the pipe exactly in the pipe cutting machine by the required length for cutting to size. The tube is advanced step by step during the cyclical cutting operations.

According to the invention a controlled, floating cutting mandrel is arranged in the pipe, and a magnetic coupling is provided with a coupling stator arranged outside the pipe and a coupling rotor which is arranged on the stationary mandrel and interacts with the coupling stator. The magnetic coupling forms a magnetic field between the coupling rotor and the coupling stator. A movement of the magnetic field in the longitudinal direction can be controlled using control values. The movement of the magnetic field can be effected in different ways.

Furthermore, a position sensor is provided with a sensor stator which is connected to the frame of the pipe cutting machine in a fixed position and a sensor rotor connected to the stationary mandrel in a fixed position, by which axial deviations of the cutting mandrel from the cutting position can be measured, and a control unit is provided which converts the deviation measurement values determined by the position sensor into the control values. The control values are fed to the control unit, by means of which the cutting mandrel can be returned to the cutting position.

The invention makes use of the idea of no longer positioning the cutting mandrel by means of a rod which is guided through one or the other pipe end, but completely dispensing with this mechanical connection and instead providing the magnetic coupling, which holds the floating cutting mandrel in position, and for this purpose providing a position sensor which, in the event of displacement the magnetic coupling, measures this as a change and corrects it by means of the control unit.

The magnetic coupling preferably has in the coupling stator a row of annular permanent magnets arranged externally around the pipe, whilst the coupling rotor, which is part of the floating cutting mandrel, likewise has a row of preferably annular permanent magnets, which are designed with opposite poles to the associated magnets of the coupling stator and so pull the cutting mandrel to a cutting position by means of a magnetic force forming through the pipe wall. The magnets, preferably ring magnets of the magnetic coupling and also of the position sensor can also be designed as electric magnets. Corresponding electrical connections for the coils should then be provided. The magnets of the floating cutting mandrel can also be designed as permanent magnets and the outer magnets of the sensor stator and coupling stator can be designed as electric magnets, from and to which electrical leads can be easily laid.

When the magnetic coupling is formed by permanent magnets it is adjustable in the axial direction, for example by the entire housing of the coupling stator being displaceable in the axial direction. When the magnets are electric magnets, coils can be switched so that the magnetic field shifts to and fro in the axial direction. In both cases the magnetic field of the magnetic coupling is displaceable in the axial direction in order thus to correctly orient the cutting mandrel newly or initially in its position relative to the die cutter.

The movement of the magnetic field of the magnetic coupling is determined by control values which are determined by measurement values of the position sensor. The position sensor preferably has a sensor rotor which has at least two magnets spaced apart from one another in the longitudinal direction. The sensor stator has at least two sensor rings, each having at least two Hall effect sensors. Changing magnetic field strength are measured by the Hall effect sensors by the axial movement of the magnets in the axial longitudinal direction. The measurement values are determined and preferably processed and fed to the magnetic coupling as control values.

The Hall effect sensors are advantageously connected to the control unit, the measurement values of the Hall effect sensors of a sensor ring are each assigned a sensor ring measurement value, and from changes to sensor ring measurement value differences a deviation of the cutting mandrel from the cutting position is calculated and the deviation measurement values are generated. Average values, preferably weighted average values, can preferably be formed from the measurement values of the Hall effect sensors of a sensor ring and these are fed as sensor measurement value to the control unit. Thus each sensor ring leads to a sensor ring, and in the event of movement of the cutting mandrel each sensor ring generates other sensor ring measurement values by movement of the magnets of the cutting mandrel relative to the sensor stator, and the movement of the cutting mandrel out of the cutting position can be calculated from the sensor ring measurement value differences. Corresponding control values are determined, and the movement of the cutting mandrel is reversed by corresponding movement of the magnetic field of the magnetic coupling.

The object is also achieved by a method for cutting pipe sections to size of the type referred to in the introduction and having the features of claim 5.

According to the invention a floating cutting mandrel is introduced into the pipe, the pipe is introduced into a die cutter until a cutting surface between pipe section and pipe is arranged in an extension of the die gap and the floating cutting mandrel is oriented in its axial position and moved into a cutting position in which a cutting mandrel gap is arranged inside the extension of the die gap.

The method is suitable in particular to be carried out with one of the pipe cutting machines referred to in the introduction. Conversely, the pipe cutting machines referred to in the introduction are all suitable for carrying out the said method or the following methods.

A position sensor preferably measures movements of the cutting mandrel out of a cutting position and feeds measurement values to the control unit, which determines the movement measurement values and converts them into control values and feeds them to a magnetic coupling, which moves the cutting mandrel back into its cutting position.

Measurement values are preferably measured by Hall effect sensors arranged along a measurement ring and are processed to produce a sensor ring measurement value, and the sensor ring measurement values of at least two measurement rings are determined and compared with sensor ring measurement values of a cutting position, and the movement measurement values are calculated from the comparison. The movement measurement values can then be converted by the control unit into the said control measurement values.

The measurement values of the Hall effect sensors of a measurement ring are advantageously calculated by averaging the individual measurement values of the Hall effect sensors. In this case the averaging should also be weighted.

For evaluation of the averaged measurement values, differences between the averaged measurement values can be calculated and compared with the differences of the averaged measurement values of the cutting position, and the movement measurement values are calculated from this difference.

The invention is described with reference to an embodiment in nine drawings. In the drawings.

Figure 1:
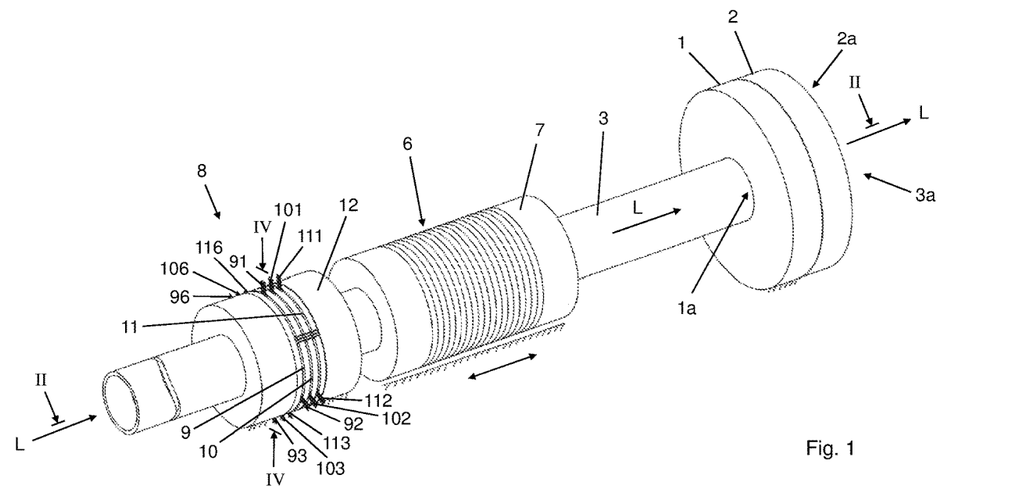
FIG. 1 shows a perspective view of the die cutter, a magnetic coupling and a position sensor with an inserted pipe, in which a floating cutting mandrel is arranged.

FIG. 1 shows a part of a pipe cutting machine. The actual cutting operation is carried out in the pipe cutting machine by a die cutter having two co-operating cutting dies 1, 2. Cutting is also understood here as shearing. The die cutter comprises the stationary cutting die 1 and the movable cutting die 2. The stationary cutting die 1 is arranged in a fixed position relative to a frame or housing (not illustrated) of the cutting machine even during the cutting operation or shearing operation. The movable cutting die 2 is movable relative to the stationary cutting die 1 parallel to a cutting plane. The movable cutting die 2 is driven by an eccentric drive, which is likewise not illustrated, and therefore carries out an eccentric movement about a longitudinal axis L of a pipe 3 introduced into the stationary cutting die 1. The eccentric movement leads to an increasing spiral cutting movement, by which the one pipe section 3a is sheared off from the pipe 3.

Furthermore, according to the invention a magnetic coupling 6 is provided with a coupling stator 7 which is visible in FIG. 1, placed externally around the pipe, and which interacts with a coupling rotor, not illustrated in FIG. 1, which is arranged in the interior and is part of a floating cutting mandrel.

In FIG. 1 a position sensor 8 through which the pipe 3 is likewise inserted is arranged on the side of the magnetic coupling 6 located opposite the die cutter. Before the cutting operation, the pipe 3 is initially guided through the position sensor 8, then through the magnetic coupling 6 and then through the two cutting dies 1, 2 through through-holes 1a, 2a provided therefor. The state with the pipe already inserted is illustrated in FIG. 1. Three sensor rings 9, 10, 11 are arranged on the position sensor 8. Each of the sensor rings 9, 10, 11 has six Hall effect sensors 91, 92, 93, 94, 95, 96, 101, 102, 103, 104, 105, 106, 111, 112, 113, 114, 115, 116. The position sensor 8 comprises a sensor stator 12 illustrated in FIG. 1 and arranged externally around the pipe 3 as well as a sensor rotor 19 designed as part of a floating cutting mandrel 13.

The coupling stator 7 can be arranged in a fixed position relative to the frame of the pipe cutting machine. However, it can also be designed to be movable to and fro by means of a linear motor. In the first case a control is provided which makes it possible for magnetic fields formed by the coupling stator 7 to be moved to and fro in the longitudinal direction L of the pipe 3 which corresponds to an axial direction. In the second case this movement of the magnetic field is performed by the linear motor which moves the magnetic fields in the coupling stator 7. The movement is illustrated by the double arrow.

Figure 2:
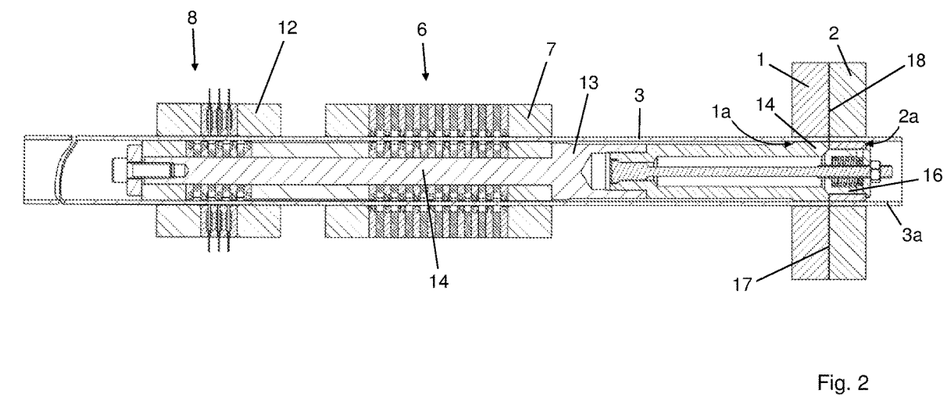
FIG. 2 shows a sectional view of the arrangement in FIG. 1 along the line II-II in FIG. 1, with a section of the cutting mandrel introduced into the pipe.
Figure 3A:
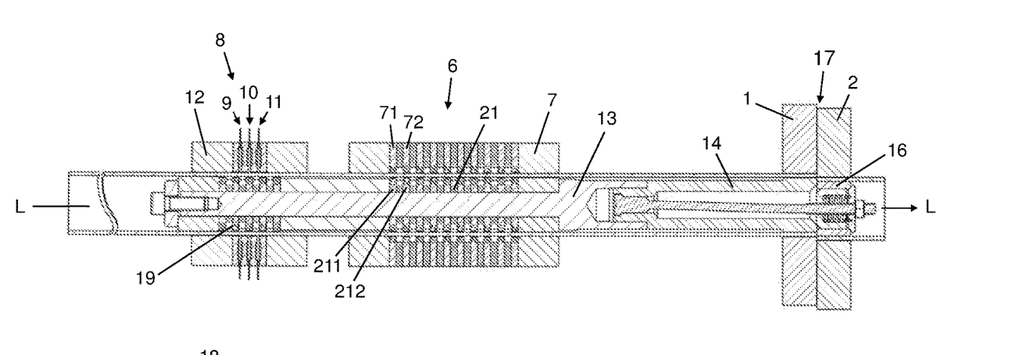
FIG. 3a shows a sectional view in FIG. 2 with deflected, movable cutting die and one pipe section cut to size from the pipe.

FIG. 2 shows the sectional view of FIG. 1 along the line II-II. Both cutting dies 1, 2 each have the cylindrical holes 1a, 2a of the same size with an internal diameter which corresponds to the external diameter of the pipe 3, wherein the two holes 1a, 2a in FIG. 2 are arranged congruently, so that one end of the pipe 3 is inserted through both holes 1a, 2a simultaneously. In the pipe 3 the floating cutting mandrel 13 is already arranged in a cutting position. The floating cutting mandrel 13 is not led out to the exterior either at one end or the other end of the pipe 3, in order to connect it to the frame, a guide rod or other devices of the pipe cutting machine. In principle, the cutting mandrel 13 is freely movable to and fro in the longitudinal direction L of the pipe 3. The cutting mandrel 13 has a stationary mandrel 14 as well as a movable mandrel 16. The movable mandrel 16 is designed to be movable perpendicular to the longitudinal direction L relative to the stationary mandrel 14 in all directions. During the cutting operation, the movable mandrel 14 absorbs the forces of the movable cutting die 2 on an inner wall face and guides them through the interior of the pipe section 3a to be cut to size to an opposing inner wall face of the pipe sections 3a to be cut to size, so that during a movement of the movable cutting die 2 from the top downwards, as illustrated in FIG. 3a, the upper region and the lower region of the pipe section 3a of the pipe are sheared off. In this case the lateral regions are initially somewhat deformed. The entire pipe section 3a is sheared off from the pipe 3 by an eccentric movement of the deflectable cutting die 2. FIG. 2 shows the pipe 3 in the cutting position in which the die gap 17 and the cutting mandrel gap 18 lie directly one above the other. Centre planes of the two gaps 17, 18 coincide.

Figure 3B:
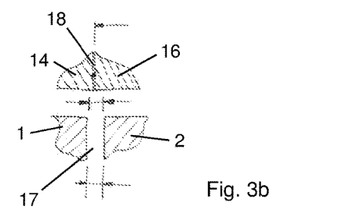
FIG. 3b shows a view of a detail in FIG. 3a with the representation of the relative size of a cutting mandrel gap and a die cutting gap.

FIG. 3a shows the floating cutting mandrel 13 in a deflected state during the shearing operation. In this case the movable mandrel 14 is deflected downwards. The view of a detail in FIG. 3b shows that for carrying out the cutting movement it is significant that a die gap 17 between the stationary cutting die 1 and the movable cutting die 2, which is approximately 0.2 mm+/−0.05 mm, surrounding the pipe 3, defines a region within which a cutting mandrel gap 18 is located between the movable mandrel 16 and the mandrel 14. The cutting mandrel gap here is approximately 0.01 mm+/−0.005 mm. Otherwise the cutting dies 1, 2 would be damaged during shearing off.

The exact positioning of the floating cutting mandrel 13 in the pipe 3 is reached according to the invention by the position sensor 8 in conjunction with the magnetic coupling 6.

The position sensor 8 comprises the sensor stator 12 situated externally around the pipe and the sensor rotor 19, which is designed as a section of the cutting mandrel 13 and is arranged on the end of the cutting mandrel 13 opposite the movable mandrel 16. Fundamentally, however, the position sensor 8 and the magnetic coupling 6 can also be interchanged on the cutting mandrel 13.

Likewise the magnetic coupling 6 consists of the coupling stator 7, which can be arranged movably relative to the frame of the pipe cutting machine, or the magnetic fields can be movable to and fro by means of a linear motor. The coupling stator 7 interacts with a coupling rotor 21, which likewise forms a section of the cutting mandrel 13.

In the embodiment according to FIG. 3a the magnetic coupling is formed by two rows of magnets. The coupling stator 7 has a first row of ring magnets 71, 72 arranged one behind the other, which form alternately inwardly directed north and south poles.

The coupling rotor 21 has a second row of magnets 211, 212 which are, however, arranged the other way round, so that a coupling behaviour is set and the cutting mandrel 13 is pulled automatically by the two magnets into the cutting position in which the magnets of the two rows of magnets assume the smallest distance from one another. Thus the magnetic coupling 6 is suitable primarily for cutting non-ferromagnetic pipes which are made completely from stainless steel, brass, copper and titanium or mixtures thereof; in principle, ferromagnetic pipes 3 could also be cut if the magnets are sufficiently strong.

The position of the magnetic coupling 6, that is to say the coupling stator 7, spaced apart from the die cutter 1 is set with regard to the dimensions of the cutting mandrel 13. In the course of a plurality of successive cutting operations, slight movements can already occur due to temperature influences which act on the machine and can effect the changes in length in the range of dimensions of tenths of millimetres illustrated in FIG. 3b, but these can hinder or even prevent the shearing operation. In order for example to readjust changes in length, the position of the floating mandrel 13 relative to the stationary cutting die 1, in particular the position of the cutting mandrel gap 18 relative to the die gap 17, is controlled continuously or regularly with the aid of the position sensor 8.

Figure 4:
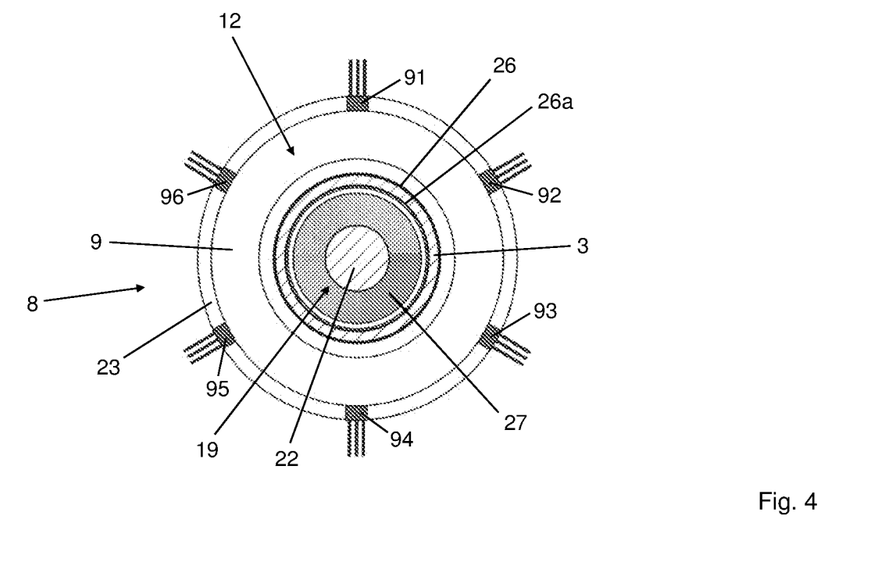
FIG. 4 shows a sectional view along the line IV-IV in FIG. 1 with the arrangement of six Hall effect sensors on the sensor stator.

The position sensor 8 in FIG. 3a has the three sensor rings 9, 10, 11 with the respective six Hall effect sensors 91, 92, 93, 94, 95, 96, 101, 102, 103, 104, 105, 106, 111, 112, 113, 114, 115, 116, as illustrated in the sectional view in FIG. 4, shown on the first sensor ring 9. The other sensor rings 10, 11 are structurally identical to the first sensor ring 9. It is also conceivable that each of the sensor rings 9, 10, 11 has two or four or even a higher number of Hall effect sensors 91, 92, 93, 94, 95, 96, 101, 102, 103, 104, 105, 106, 111, 112, 113, 114, 115, 116. However, at least two are necessary, which are then arranged offset by 180° in each case. In the exemplary embodiment the six Hall effect sensors 91, 92, 93, 94, 95, 96 are shown, which are arranged offset by 60° in each case. The six Hall effect sensors 91, 92, 93, 94, 95, 96 of the first sensor ring 9 are recessed in a surrounding iron ring 23, and the sensor rings 9, 10, 11 are guided in a guide sleeve 24 according to FIG. 5. The guide sleeve 24 has a cylindrical opening 25 which corresponds to the outer tube diameter and is inserted through the pipe 3.

Between the outer pipe wall and the guide sleeve 24 of the sensor stator 12 a small clearance 26 of the size of a fraction of a millimetre is provided, so that the pipe 3 can also be inserted through the cylindrical opening 25 of the sensor stator 12.

Furthermore, an equally small clearance 26a is provided between the pipe 3 and the permanent magnet ring 27. The sensor rotor 19 is provided in the interior of the pipe 3. A permanent magnet ring 27 which externally constitutes a north pole is illustrated in a sectional view in FIG. 4. The permanent magnet ring 27 is fitted onto a non-magnetic, i.e. paramagnetic or diamagnetic holding rod 22. An external diameter of the permanent magnet ring 27 corresponds to the internal diameter of the pipe 3, likewise minus a small clearance of a fraction of a millimetre.

Figure 5:
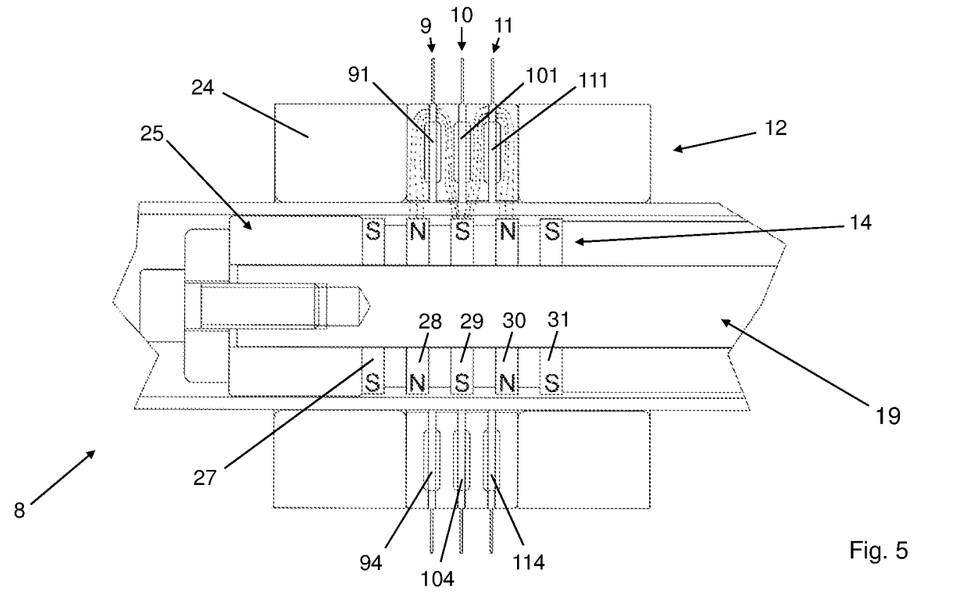
FIG. 5 shows a functional representation of the position sensor with sensor stator and sensor rotor in the cutting position with magnetic field line indicated.
Figure 6:
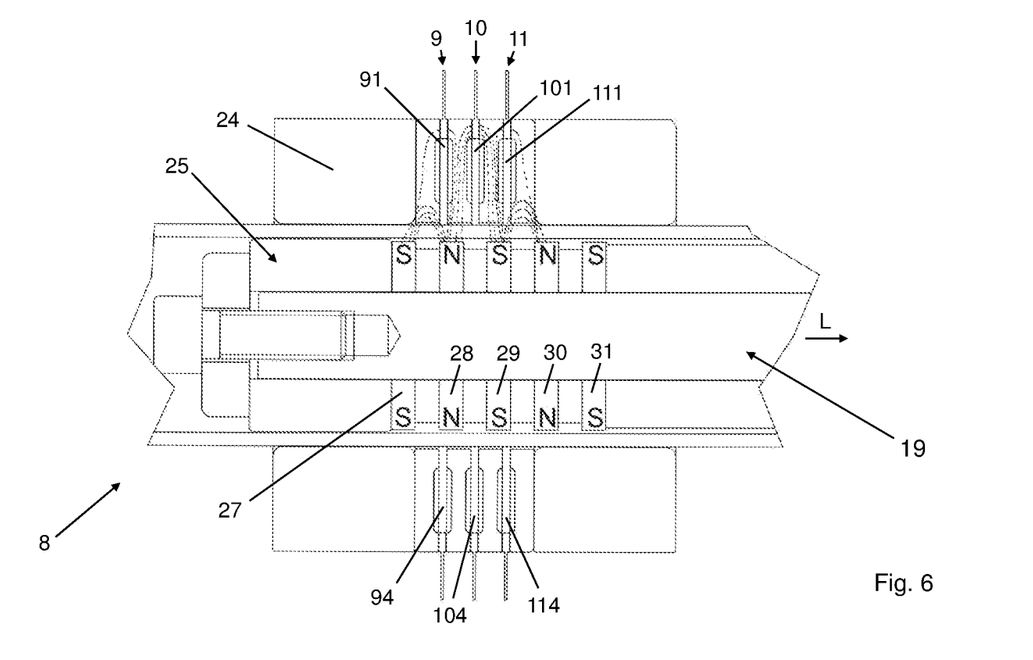
FIG. 6 shows a representation according to FIG. 5 with the cutting mandrel moved towards the left out of the cutting position and the associated magnetic field lines.
Figure 7:
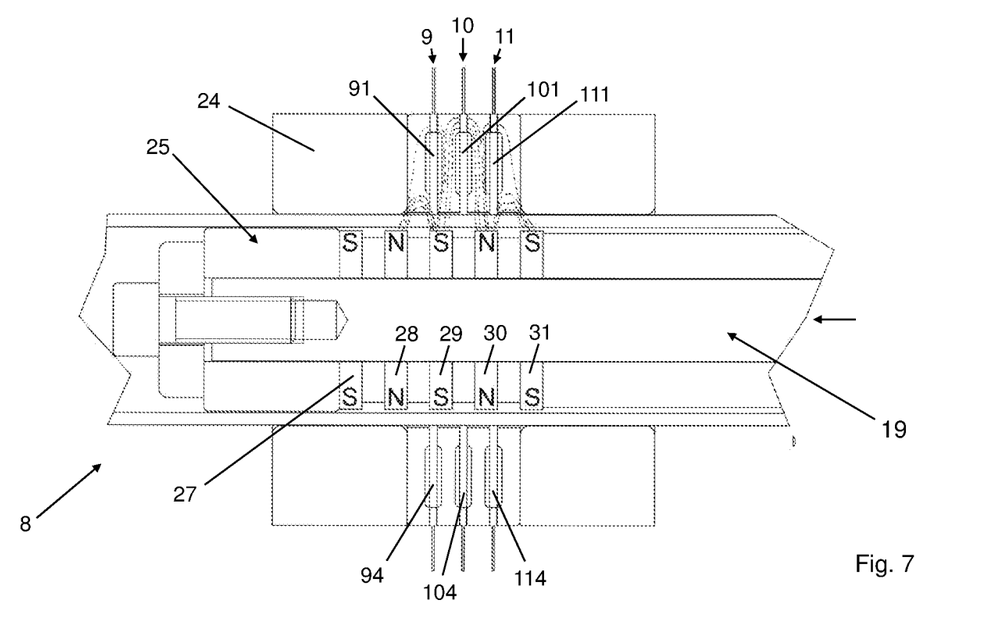
FIG. 7 shows a representation according to FIG. 5 with the cutting mandrel moved towards the right out of the cutting position with associated magnetic field lines.

FIG. 5 shows five permanent magnet rings 27, 28, 29, 30, 31 according to FIG. 4. The interaction of the permanent magnet rings 27, 28, 29, 30, 31 of the sensor rotor 19 and the Hall effect sensors 91, 92, 93, 94, 95, 96, 101, 102, 103, 104, 105, 106, 111, 112, 113, 114, 115, 116 of the sensor stator 12 is illustrated in FIGS. 5, 6 and 7 with associated magnetic field lines. Each of the Hall effect sensors 91, 92, 93, 94, 95, 96, 101, 102, 103, 104, 105, 106, 111, 112, 113, 114, 115, 116 measures the magnetic field strength at the radially outer end of the sensor ring 9, 10, 11 associated with it, i.e. at the point at which the Hall effect sensors 91, 92, 93, 94, 95, 96, 101, 102, 103, 104, 105, 106, 111, 112, 113 114 115, 116 according to FIG. 4 are arranged.

FIG. 5 shows the design of the magnetic field lines in the cutting position, i.e. the position when according to FIG. 2 and FIG. 3b the cutting mandrel gap 18 is arranged completely inside the die cutting gap 17. It can be seen that the sensor 101 receives no signal, whilst the sensors 91 and 111 receive a relatively strong signal.

Figure 8:
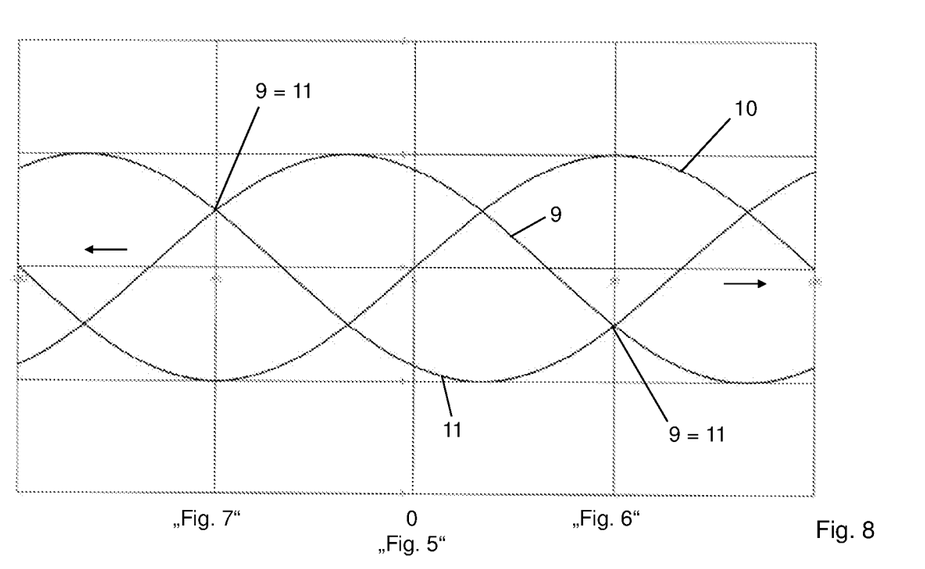
FIG. 8 shows a graph of measurement values of the three sensor rings illustrated in FIGS. 5, 6 and 7 with Hall effect sensors during movement of the cutting mandrel towards the left and right out of the cutting position.

The associated measurement values are illustrated in FIG. 8 on the zero line. In fact it is the case that the measurement values of an individual Hall effect sensor are not indicated in FIG. 8 and fed to a control unit. Since the permanent magnet rings 27, 28, 29, 30, 31 of the sensor rotor 19 are also movable perpendicularly to the longitudinal direction L through the clearance and the Hall effect sensors 91, 92, 93, 94, 95, 96, 101, 102, 103, 104, 105, 106, 111, 112, 113 114 115, 116 react extremely sensitively to changes in the magnetic field strength, a weighted or simple, non-weighted average value of the Hall effect sensors 91, 92, 93, 94, 95, 96, 101, 102, 103, 104, 105, 106, 111, 112, 113 114 115, 116 of a sensor ring 9, 10, 11 is advantageously formed. In principle other calculations of the measurement values of the individual Hall effect sensors 91, 92, 93, 94, 95, 96, 101, 102, 103, 104, 105, 106, 111, 112, 113 114 115, 116 of a sensor ring 9, 10, 11 can be performed. However, average values or weighted average values appear to be particularly suitable. These weighted average values are then fed to the control unit as a measurement value according to FIG. 8.

FIG. 6 shows the magnetic field lines during a movement of the floating cutting mandrel 13 in the direction of the cutting die 1. Due to the movement of the permanent magnet rings 27, 28, 29, 30, 31 a strong magnetic field is produced on the sensor ring 10, whilst the magnetic fields decrease on the Hall effect sensors 91, 92, 93, 94, 95, 96, 111, 112, 113 114 115, 116 of the sensor rings 9 and 11. This is illustrated in FIG. 8 in the "FIG. 6" position, which corresponds to FIG. 6.

Correspondingly, in FIG. 7 which corresponds to the "FIG. 7" position in FIG. 8, the cutting mandrel 13 is moved away from the cutting die 1. Here too, the sensor ring 10 receives a maximum measurement signal, but in precisely the opposite direction, since the field lines have reversed their direction relative to FIG. 6, whilst the sensor rings 9 and 11 in turn experience a weak signal, likewise in the opposite direction. The measurement values are likewise illustrated. In a continuous movement the three sensor rings 9, 10, 11 would produce a measurement value curve in sinusoidal form, as illustrated in FIG. 8.

From the distance of the measurement values according to FIG. 8 relative to one another in the "FIG. 6" and "FIG. 7" positions by comparison with the position of the measurement values in the cutting position, that is to say the zero position in FIG. 8, it is possible to calculate the distance by which he cutting mandrel 13 has moved relative to the sensor stator 12 and thus has been moved out of the cutting position. In order to correct this distance, the corresponding measurement values are converted into control values by the control unit (not illustrated) and are fed to the magnetic coupling 6. The magnetic coupling 6 then moves the coupling stator 7 forwards or backwards corresponding to the cutting die 1 in order to compensate this measured spacing precisely. Alternatively, a magnetic field generated in the coupling stator 7 is moved axially to or fro.

LIST OF REFERENCE NUMERALS 1 stationary cutting
1a hole
2 movable cutting die
2a hole
3 pipe
3a pipe section
6 magnetic coupling
7 coupling stator
8 position sensor
9 sensor ring
10 sensor ring
11 sensor ring
12 sensor stator
13 floating cutting mandrel
14 stationary mandrel
16 movable mandrel
17 die gap
18 cutting mandrel gap
19 sensor rotor
21 coupling rotor
22 holding rod
23 iron ring
24 guide sleeve
25 cylindrical opening
26 clearance
26a clearance
27 permanent magnet ring
28 permanent magnet ring
29 permanent magnet ring
30 permanent magnet ring
31 permanent magnet ring 71 ring magnet
72 ring magnet
91 Hall effect sensor
92 Hall effect sensor
93 Hall effect sensor
94 Hall effect sensor
95 Hall effect sensor
96 Hall effect sensor
101 Hall effect sensor
102 Hall effect sensor
103 Hall effect sensor
104 Hall effect sensor
105 Hall effect sensor
106 Hall effect sensor
111 Hall effect sensor
112 Hall effect sensor
113 Hall effect sensor
114 Hall effect sensor
115 Hall effect sensor
116 Hall effect sensor
211 ring magnet
212 ring magnet
L longitudinal direction

The invention claimed is:

1. Pipe cutting machine with a pipe (3), from which a pipe section (3a) is to be cut to size, a stationary cutting die (1), a movable cutting die (2) which can be moved relative to the stationary cutting die (1), and a cutting mandrel (13) which is introduced into the pipe (3) and which comprises a stationary mandrel (14) and a mandrel (16) that can be moved relative to the stationary mandrel (14), wherein the cutting mandrel (13) is arranged in a cutting position in a floating manner,
characterised in that the cutting mandrel (13) is arranged in the pipe (3) in a floating manner, and
a magnetic coupling (6) is provided with a coupling stator (7) arranged outside of the pipe (3) and a coupling rotor (21) arranged on the stationary mandrel (14), and a movement of a magnetic field of the magnetic coupling (6) in a longitudinal direction (L) can be controlled using control values, and
a position sensor (8) has a sensor stator (12), which is connected to a frame in a fixed position, and a sensor rotor (19), which is connected to the stationary mandrel (14) in a fixed position, said position sensor being used to measure deviations of the cutting mandrel (13) from the cutting position, and a control unit converts deviation measurement values into the control values, by means of which the cutting mandrel (13) can be returned to the cutting position.

2. Pipe cutting machine according to claim 1, characterised by an eccentric drive for the movable cutting die (2).

3. Pipe cutting machine according to claim 1, characterised in that the sensor rotor (19) has at least two magnetic poles spaced apart from one another in the longitudinal direction (L) and the sensor stator (12) has at least two sensor rings (9, 10, 11) each having at least two Hall effect sensors (91, 92, 93, 94, 95, 96, 101, 102, 103, 104, 105, 106, 111, 112, 113 114 115, 116).

4. Pipe cutting machine according to claim 3, characterised in that the Hall effect sensors (91, 92, 93, 94, 95, 96, 101, 102, 103, 104, 105, 106, 111, 112, 113, 114, 115, 116) are connected to the control unit, measurement values of the Hall effect sensors (91, 92, 93, 94, 95, 96, 101, 102, 103, 104, 105, 106, 111, 112, 113 114 115, 116) of each of the sensor rings (9, 10, 11) are in each case assigned a sensor ring measurement value, and from a change to sensor ring measurement value differences a deviation of the cutting mandrel (13) from the cutting position is calculated and the deviation measurement values are generated.

5. Method for cutting pipe sections (3a) of a pipe (3) to size, wherein
a floating cutting mandrel (13) is introduced into the pipe (3),
the pipe (3) is introduced into a die cutter (1, 2) having a die gap (17) until a cutting surface between the pipe section (3a) and the pipe (3) is arranged in an extension of the die gap (17),
the floating cutting mandrel is oriented in the longitudinal direction (L) and moved into a cutting position in which a cutting mandrel gap (18) is arranged in the extension of the die gap (17),
a position sensor (8) measures deviations of the cutting mandrel (13) from a cutting position and feeds the deviations to a control unit, the control unit converts the deviation measurements into control values and feeds the control values to a magnetic coupling (6), which moves the cutting mandrel (13) back into the cutting position.

6. Method according to claim 5, characterised in that measurement values of Hall effect sensors (91, 92, 93, 94, 95, 96, 101, 102, 103, 104, 105, 106, 111, 112, 113, 114, 115, 116) arranged along a sensor ring (9, 10, 11) are measured and processed to produce a sensor ring measurement value, and the sensor ring measurement values of at least two sensor rings (9, 10, 11) are determined and are compared with sensor ring measurement values of a zero position, and deviation measurement values are calculated from the comparison.

7. Method according to claim 6,
characterised in that the measurement values of the Hall effect sensors (91, 92, 93, 94, 95, 96, 101, 102, 103, 104, 105, 106, 111, 112, 113 114 115, 116) of the sensor ring (9, 10, 11) are averaged.

8. Method according to claim 7,
characterised in that differences between the averaged measurement values are calculated and compared with the differences of averaged measurement values of the cutting position.

* * * * *